(12) United States Patent
Zhang (10) Patent No.: US 10,598,975 B2
(45) Date of Patent: Mar. 24, 2020

(54) DISPLAY PANEL HAVING FIRST PILLAR SPACERS OVERLAPPING FIRST TOUCH ELECTRODES AND SECOND PILLAR SPACERS PARTIALLY OVERLAPPING A GAP BETWEEN ADJACENT FIRST TOUCH ELECTRODES AND DISPLAY DEVICE INCLUDING THE SAME

(71) Applicants: Xiamen Tianma Micro-Electronics Co., Ltd, Xiamen (CN); Tianma Micro-Electronics Co., Ltd., Shenzhen (CN)

(72) Inventor: Lei Zhang, Xiamen (CN)

(*) Notice: Subject to any disclaimer, the term of this patent is extended or adjusted under 35 U.S.C. 154(b) by 243 days.

(21) Appl. No.: 15/355,054

(22) Filed: Nov. 18, 2016

(65) Prior Publication Data

US 2017/0068366 A1 Mar. 9, 2017

(30) Foreign Application Priority Data

Jul. 29, 2016 (CN) .......................... 2016 1 0617111

(51) Int. Cl.
*G02F 1/1333* (2006.01)
*G06F 3/041* (2006.01)
*G02F 1/1339* (2006.01)

(52) U.S. Cl.
CPC ........ *G02F 1/13338* (2013.01); *G06F 3/0414* (2013.01); *G02F 1/13394* (2013.01); *G02F 2001/13396* (2013.01); *G02F 2201/123* (2013.01)

(58) Field of Classification Search
CPC . G02F 2001/13629; G02F 2001/13396; G02F 2001/13398
See application file for complete search history.

(56) References Cited

U.S. PATENT DOCUMENTS

| | | | |
|---|---|---|---|
| 2008/0129898 A1* | 6/2008 | Moon | G02F 1/13338 349/12 |
| 2009/0278810 A1* | 11/2009 | Ma | G06F 3/0412 345/173 |
| 2010/0020029 A1* | 1/2010 | Park | G06F 3/0412 345/173 |

(Continued)

FOREIGN PATENT DOCUMENTS

| | | |
|---|---|---|
| CN | 104020893 A | 9/2014 |
| CN | 205193762 U | 4/2016 |
| CN | 105759482 A | 7/2016 |

*Primary Examiner* — Paul C Lee
(74) *Attorney, Agent, or Firm* — Kilpatrick Townsend & Stockton, LLP (57) ABSTRACT

The invention discloses a display panel and a display device including the same, wherein the display panel includes a first substrate, a second substrate arranged opposite to the first substrate, and first pillar spacers and second pillar spacers arranged between the first substrate and the second substrate, wherein a height of the first pillar spacers is larger than a height of the second pillar spacer; the first substrate includes a plurality of first touch electrodes; and the first pillar spacers include first ends away from the second substrate, and orthographic projections of the first ends of the first pillar spacers onto a plane where the first substrate is located lie in orthographic projections of the first touch electrodes onto the plane where the first substrate is located.

17 Claims, 9 Drawing Sheets

(56) References Cited

U.S. PATENT DOCUMENTS

| | | | |
|---|---|---|---|
| 2010/0033448 A1* | 2/2010 | Koito | G02F 1/13338 345/174 |
| 2010/0033668 A1* | 2/2010 | Koito | G02F 1/13338 349/155 |
| 2010/0053112 A1 | 3/2010 | Chen | |
| 2010/0097548 A1* | 4/2010 | Koito | G02F 1/13338 349/113 |
| 2010/0156827 A1* | 6/2010 | Joo | G02F 1/13338 345/173 |
| 2010/0194710 A1* | 8/2010 | Koito | G06F 3/0412 345/174 |
| 2011/0134060 A1* | 6/2011 | Sung | G06F 3/0412 345/173 |
| 2011/0210927 A1* | 9/2011 | Mizuhashi | G06F 3/044 345/173 |
| 2012/0133612 A1 | 5/2012 | Wang et al. | |
| 2014/0043280 A1 | 2/2014 | Cok | |
| 2014/0168538 A1* | 6/2014 | Kim | G06F 3/044 349/12 |
| 2015/0035785 A1 | 2/2015 | Singh et al. | |

\* cited by examiner

DISPLAY PANEL HAVING FIRST PILLAR SPACERS OVERLAPPING FIRST TOUCH ELECTRODES AND SECOND PILLAR SPACERS PARTIALLY OVERLAPPING A GAP BETWEEN ADJACENT FIRST TOUCH ELECTRODES AND DISPLAY DEVICE INCLUDING THE SAME

CROSS-REFERENCES TO RELATED APPLICATION

This application claims the priority of Chinese Patent Application No. 201610617111.6 filed on Jul. 29, 2016, the content of which is incorporated herein by reference in its entirety.

TECHNICAL FIELD

This disclosure generally relates to the field of display technologies, particularly to a touch display technology, and more particularly to a display panel and a display device including the same.

BACKGROUND

A traditional liquid crystal display panel typically includes an array substrate, a color filter substrate arranged opposite to the array substrate, and a liquid crystal layer formed between the array substrate and the color filter substrate. In order to support and protect the liquid crystal layer between the array substrate and the color filter substrate, typically a plurality of pillar spacers can be arranged between the array substrate and the color filter substrate. The pillar spacers include primary pillar spacers and secondary pillar spacers, where the height of the primary pillar spacers is larger than the height of the secondary pillar spacers. One ends of the primary pillar spacers and the secondary pillar spacers are formed on the side of the color filter substrate proximate to the array substrate. When there is no external force being applied, the primary pillar spacers contact the array substrate. The primary pillar spacers may contact with the array substrate anywhere in a non-transparent area in a display area of the array substrate.

As the touch function is integrated in the liquid crystal display panel, a common electrode arranged on the array substrate is generally divided into a plurality of sub-common electrodes to thereby position a touch location. Since the surface of the array substrate corresponding to the sub-common electrodes and the surface of the array substrate corresponding to an area between two adjacent sub-common electrodes on the array substrate are different in height, if there are some primary pillar spacer arranged on the surface of the array substrate corresponding to the sub-common electrodes, and some primary pillar spacer arranged on the surface of the array substrate corresponding to the area between the adjacent sub-common electrodes, then the liquid crystal layer will be made so non-uniform in thickness that the transmissivity of liquid crystals will vary, thus resulting in rippling of a displayed image.

SUMMARY

In view of the above drawbacks or defects in the prior art, it is desirable to provide a display panel and a display device including the same so as to address some technical problems in the prior art as mentioned above.

In a first aspect, embodiments provide a display panel including a first substrate, a second substrate arranged opposite to the first substrate, and first pillar spacers and second pillar spacers arranged between the first substrate and the second substrate. A height of the first pillar spacers is larger than a height of the second pillar spacer. The first substrate includes a plurality of first touch electrodes; and the first pillar spacers include first ends away from the second substrate, and orthographic projections of the first ends of the first pillar spacers onto a plane where the first substrate is located lie in orthographic projections of the first touch electrodes onto the plane where the first substrate is located.

In a second aspect, embodiments provide a display device including the display panel as described above.

With the solutions of the disclosure, the ends of the respective first pillar spacers in contact with the array substrate are arranged in the areas corresponding to the first touch electrodes, so that a liquid crystal layer between the array substrate and the color filter substrate consisted of the plurality of first pillar spacers is uniform in thickness as a whole to thereby avoid a displayed image from being rippled due to the non-uniform height of the surface of the array substrate in contact with the first pillar spacers.

BRIEF DESCRIPTION OF THE DRAWINGS

Other features, objects, and advantages of the disclosure will become more apparent upon review of the detailed description of non-limiting embodiments made with reference to the drawings in which.

DETAILED DESCRIPTION OF PREFERRED EMBODIMENTS

The present application will be described below in further details with reference to the drawings and the embodiments thereof. It can be appreciated that the particular embodiments described here are merely intended to illustrate but not limit the invention. It shall be further noted that only the components related to the present application are illustrated in the drawings for the sake of a convenient description.

It shall be noted that the embodiments of the disclosure, and the features of the embodiments can be combined with each other unless they conflict with each other. The present application will be described below in details with reference to the drawings and the embodiments thereof.

Figure 1A:
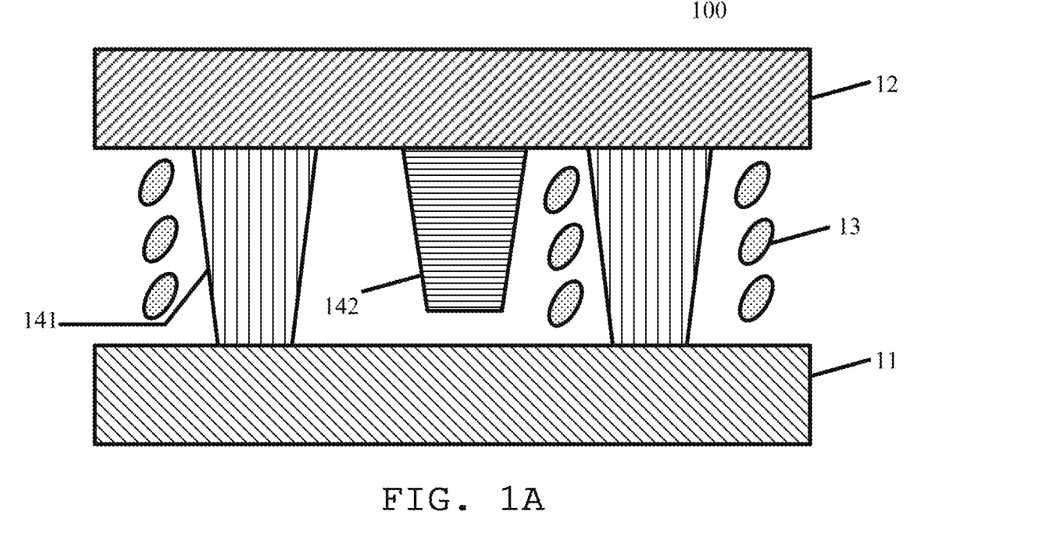
FIG. 1A illustrates a schematic structural diagram of a display panel according to an embodiment of the disclosure.

Reference is made to FIG. 1A which is a schematic structural diagram of a display panel according to an embodiment of the disclosure. As illustrated in FIG. 1A, the display panel 100 typically includes a first substrate 11 and a second substrate 12 arranged opposite to the first substrate 11. For example, the display panel according to the present application can be a liquid crystal display panel. When the display panel is a liquid crystal display panel, the first substrate can be an array substrate, and the second array can be a color filter substrate, for example. The liquid crystal display panel further includes a liquid crystal layer 13 arranged between the first substrate 11 and the second substrate 12, and first pillar spacers 141 and second pillar spacers 142 arranged between the first substrate 11 and the second substrate 12. The height of the first pillar spacers 141 is larger than the height of the second pillar spacers 142, where the thickness of the liquid crystal layer 13 is determined by the height of the first pillar spacers 141.

Figure 1B:
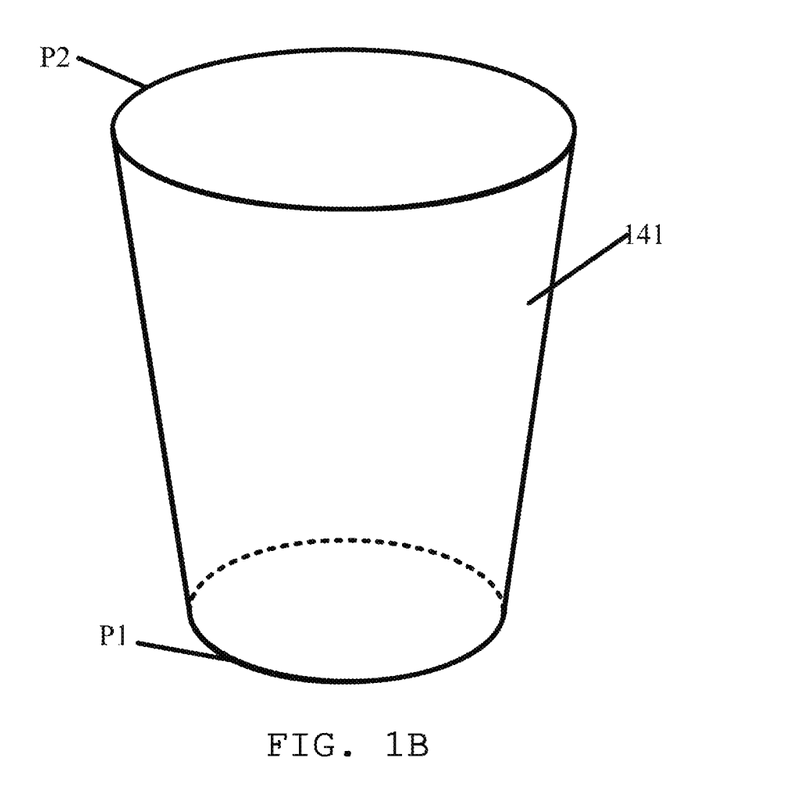
FIG. 1B illustrates a schematic structural diagram of a first pillar spacer in the display panel according to the embodiment of the disclosure.

Referring to FIG. 1B which illustrates a schematic structural diagram of a first pillar spacer 141 in the display panel according to the present application. As illustrated in FIG. 1B, the shape of the first pillar spacer 141 is a truncated cone. The first pillar spacer 141 includes a first end P1 and a second end P2. Both the first end P1 and the second end P2 are circles, and the area of the first end P1 is less than the area of the second end P2. The second end P2 of the pillar spacer P is formed on the side of the second substrate 12 proximate to the first substrate 11. The first end P1 of the first pillar spacer 141 away from the second substrate contacts with the first substrate 11. Those skilled in the art can appreciate that the shape of the second pillar spacers 142 can be similar to the shape of the first pillar spacers, and one ends of the second pillar spacers may be formed on the side of the second substrate 12 proximate to the first substrate 11.

Figure 2:
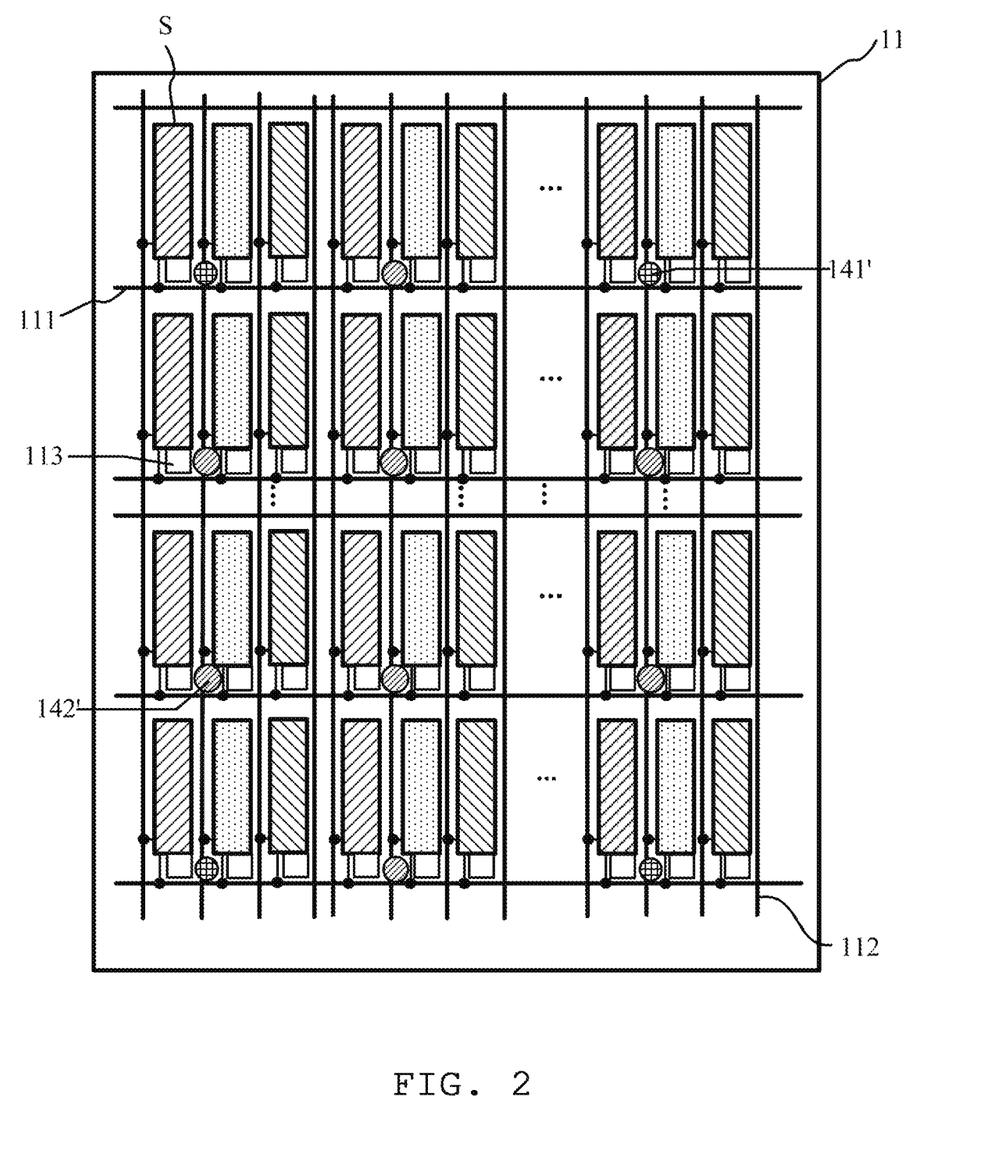
FIG. 2 illustrates a schematic diagram of a relative location relationship between scan lines, data lines, pixels, through-holes, first pillar spacers, and second pillar spacers in a first substrate.
Figure 3:
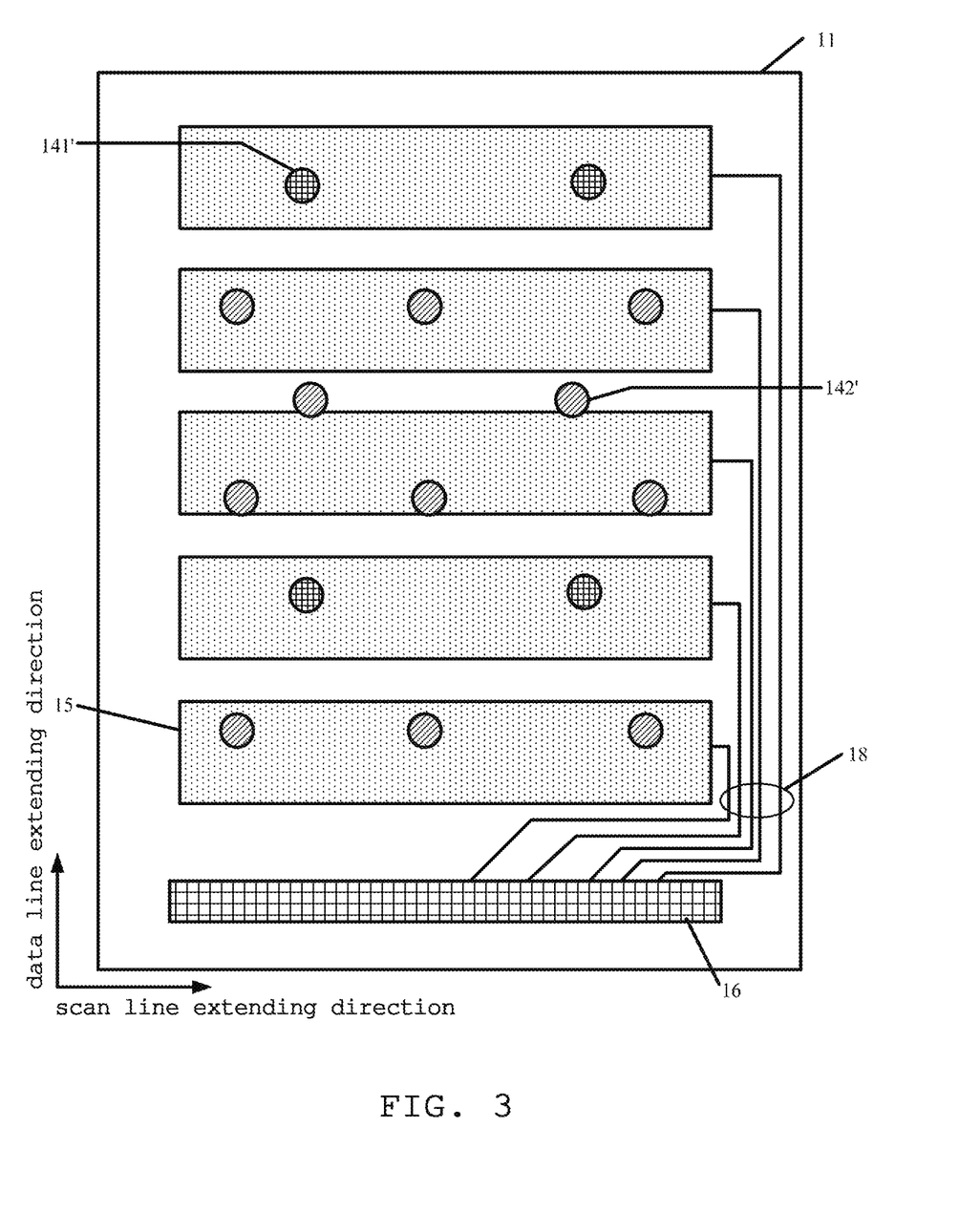
FIG. 3 illustrates a schematic diagram of the shape of first touch electrodes, and a relative location relationship between the first touch electrodes and the first pillar spacers according to an embodiment of the disclosure.

Referring to FIG. 2 and FIG. 3 together, FIG. 2 illustrates a schematic diagram of a relative location relationship between scan lines, data lines, pixels, through-holes, first pillar spacers, and second pillar spacers in the first substrate. FIG. 3 illustrates a schematic diagram of the shape of first touch electrodes, and a relative location relationship between the first touch electrodes and the first pillar spacers according to an embodiment of the disclosure in the first substrate. As illustrated in FIG. 2, there are a plurality of scan lines 111 and a plurality of data lines 112 formed on the first substrate 11. The scan lines 111 are arranged intersecting with the data lines 112. There are further a plurality of pixels on the first substrate 11, which are defined by the plurality of scan lines 111 and the plurality of data lines 112 arranged intersecting with each other. Each pixel includes a pixel electrode S, a thin film transistor (not illustrated), and a through-hole 113. The pixel electrode S is electrically connected with the thin film transistor through the through-hole 113. The orthographic projections 141' of the first ends of the first pillar spacers onto the plane where the first substrate 11 is located lie between two through-holes 113 adjacent in the direction in which the scan lines extend, that is, the first ends of the first pillar spacers are arranged between two through-holes 113 adjacent in the direction in which the scan lines extend. The ends of the second pillar spacers away from to the second substrate are arranged between two through-holes 113 adjacent in the direction in which the scan lines extend.

The first substrate 11 includes a plurality of first touch electrodes 15 insulated from each other. The orthographic projections 141' of the first ends of the pillar spacers onto the plane where the first substrate 11 is located lie in the orthographic projections of the first touch electrodes 15 onto the plane where the first substrate 11 is located. That is, the respective first pillar spacers contact with the surface of the first substrate 11 corresponding to the first touch electrodes 15. Particularly, the display panel can be fabricated by first designing the first touch electrodes 15 on the first substrate 11. Then a first pillar spacer material layer can be coated on the side of the second substrate 12 proximate to the first substrate 11. A photolithographic process can be performed on the first pillar spacer material layer using a mask with a predetermined pattern, so that a plurality of first pillar spacers are formed on the first pillar spacer material layer after the photolithographic process. The orthographic projections 141' of the first ends of the pillar spacers onto the plane where the first substrate 11 is located lie in the orthographic projections of the first touch electrodes 15 onto the plane where the first substrate is located. The first pillar spacers are arranged as such for such a benefit that the surface of the first substrate in contact with the first ends of the respective first pillar spacers are uniform in height so that the liquid crystal layer formed by the first pillar spacers is uniform in thickness as a whole to thereby avoid an image displayed on the display panel from being rippled due to a varying thickness of the liquid crystal layer resulting from the non-uniform height of the surface of the first substrate in contact with the first ends of the first pillar spacers.

In some implementations, the ends of the second pillar spacers 142 away from to the second substrate 12 are assumed as the first ends, and the orthographic projections 142' of the first ends of the second pillar spacers onto the plane where the first substrate 11 is located may overlap partially with the orthographic projection of a gap between any two adjacent first touch electrodes 15 onto the plane where the first substrate 11 is located. That is, the first ends of the second pillar spacers can each correspond to the gap between two adjacent first touch electrodes 15. It shall be appreciated that the first ends of the second pillar spacers may not be arranged in the gaps between two adjacent first touch electrodes 15. That is, the locations where the second pillar spacers are arranged will not be strictly defined. Since the first pillar spacers primarily play a role of forming the box thickness of the liquid crystal layer, and protecting the liquid crystal layer, the arrangement of the second pillar spacers will not be strictly defined so that the complexity of a process of forming the second pillar spacers can be lowered.

In some implementations, the orthographic projections 142' of the first ends of the second pillar spacers 142 onto the plane where the first substrate is located lie in the orthographic projections of the first touch electrodes onto the plane where the first substrate is located. That is, the first ends of the respective second pillar spacers are arranged on the surface of the first substrate 11 corresponding to the first touch electrodes. The second pillar spacer are arranged as such for such a benefit that if the first pillar spacers subject to an external pressure are deformed, the second pillar spacers will contact with the first touch electrodes on the first substrate to thereby enhance the protection of the liquid crystal layer. Since the thickness of the first touch electrodes in contact with the second pillar spacers is uniform above the surface of the substrate, the respective second pillar spacers can also play a role of protecting the liquid crystal layer to thereby avoid the liquid crystal layer from being further deformed, and thus irreversibly damaged.

In some implementations, as illustrated in FIG. 3, the shape of the first touch electrodes 15 can be a strip. For example, the strip-shaped first touch electrodes 15 can extend parallel to the direction in which the scan lines extend. The plurality of strip-shaped first touch electrodes 15 are arranged in the direction in which the data lines extend. Each strip-shaped first touch electrode 15 can cover a plurality of pixels.

Figure 4:
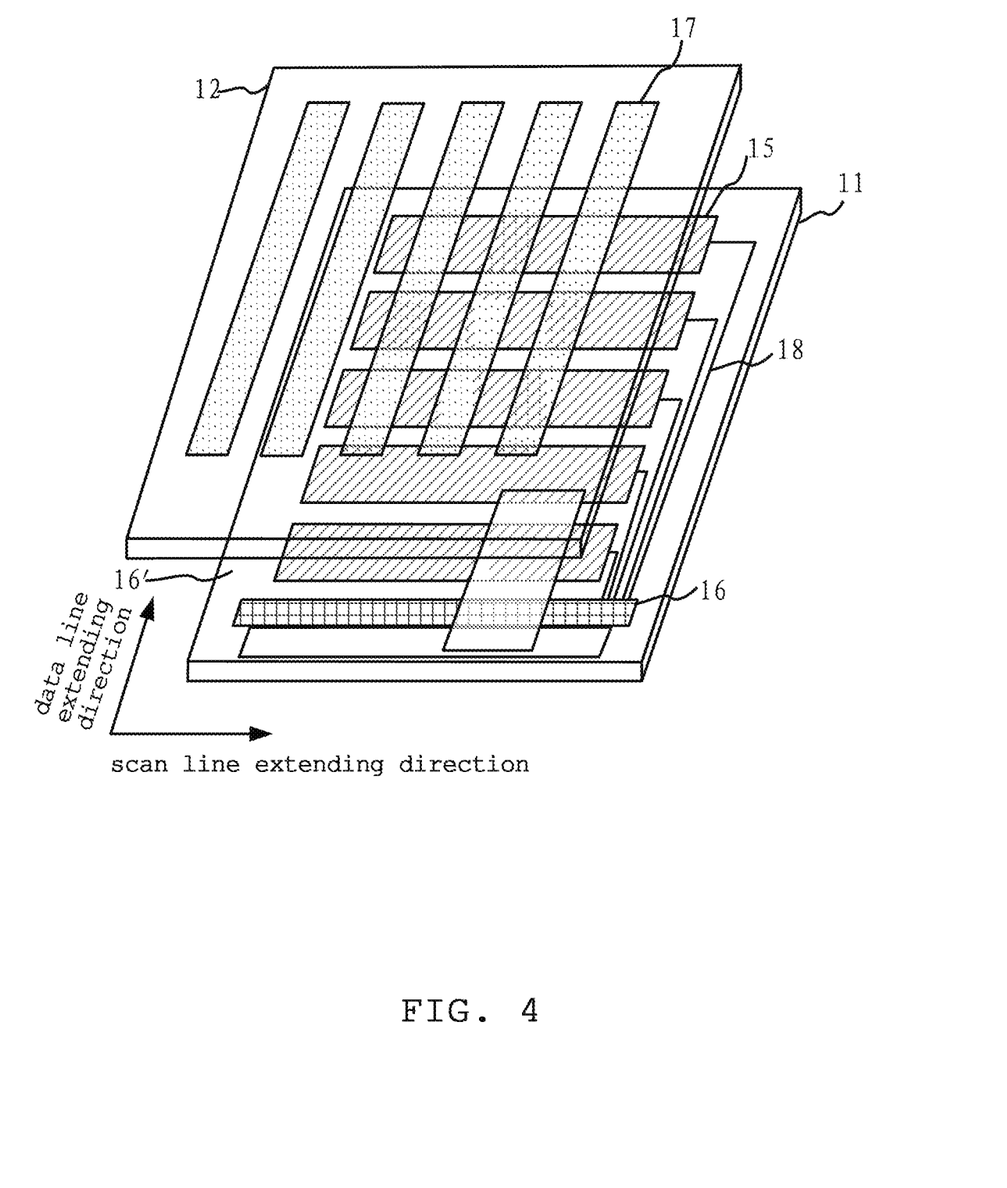
FIG. 4 illustrates a schematic structural diagram of the first substrate and a second substrate in a display panel including the first substrate illustrated in FIG. 3.

Reference is made to FIG. 4 which illustrates a schematic structural diagram of the first substrate and the second substrate in the display panel in which the first substrate is as that illustrated in FIG. 3. When the touch mode enabled on the display panel is the mutually-capacitive mode, a plurality of second touch electrodes 17 are formed on the second substrate 12 as illustrated in FIG. 4. The orthographic projections of the respective second touch electrodes 17 onto the plane where the first substrate 11 is located overlap partially with the orthographic projections of the respective first touch electrodes 15 onto the plane where the first substrate 11 is located. That is, the respective second touch electrodes 17 overlap partially with the respective first touch electrodes 15. For example, the shape of the second touch electrodes 17 can be a strip, and for example, the second touch electrodes 17 can extend parallel to the direction in which the scan lines extend. The plurality of second touch electrodes 17 can be arranged in the direction in which the data lines extend. The second touch electrodes 17 can be arranged on the side of the second substrate 12 away from the first substrate 11, or can be arranged on the side of the second substrate 12 proximate to the first substrate 11. When the second touch electrodes 17 are arranged on the side of the second substrate 12 away from the first substrate 11, the touch operation will have a stronger influence on the second touch electrodes 17, so that the touch panel can respond to the touch operation more precisely.

A first touch electrodes 15 and a second touch electrodes 17 intersecting with each other constitute two electrodes similar to a parallel plate capacitor. Areas in which the plurality of strip-shaped first touch electrodes and the plurality of strip-shaped second touch electrodes intersect with each other form a plurality of capacitors that are distributed uniformly in the display area of the display panel. In some implementations, for example, the first touch electrodes 15 can be touch emitting electrodes, and the second touch electrodes 17 can be touch sensing electrodes. In a touch period, a touch drive signal is transmitted on the first touch electrodes 15, and a capacitor is formed between the first touch electrodes 15 and the second touch electrodes 17. When a finger of a user touches at any location on the display panel, the coupling between a first touch electrode 15 and a second touch electrode 17 proximate to the touch point will vary, so that the capacitance between the first touch electrode 15 and the second touch electrode 17 proximate to the touch point will vary. The coordinates of the touch point can be concluded as a result of whether the capacitances of the plurality of capacitors formed by the respective first touch electrode 15 and the respective second touch electrode 17 intersecting with each other vary. In a display period, the first touch electrodes 15 are multiplexed as a common electrode to provide a common voltage signal for the display panel to display an image.

In some implementations, an integrated circuit 16 and first signal lines 18 are further arranged on the first substrate 11. As illustrated in FIG. 4, the integrated circuit 16 is electrically connected with the first touch electrodes 15 through the first signal lines 18. In a touch period, the integrated circuit 16 provides the first touch electrodes 15 with a touch drive signal through the first signal lines 18, where the touch drive signal can be a pulse signal with a certain duty ratio, for example. Particularly the integrated circuit 16 inputs the pulse drive signal to the respective first touch electrodes 15 sequentially. In the display period, the integrated circuit 16 provides the first touch electrodes 15 with a common voltage signal through the first signal lines 18, and particularly the integrated circuit 16 provides the respective first touch electrodes 15 with the same common electrode signal concurrently.

In some implementations, the material of the strip-shaped second touch electrodes 17 can include indium tin oxide, for example.

Figure 5:
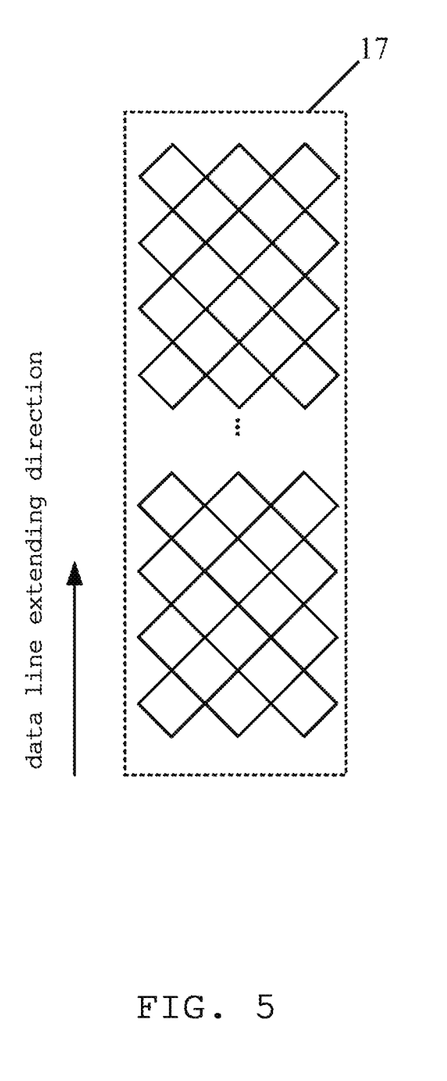
FIG. 5 illustrates a schematic structural diagram of second touch electrodes in the second substrate illustrated in FIG. 4.

Reference is made to FIG. 5 whish illustrates a schematic structural diagram of a second touch electrode in the second substrate illustrated in FIG. 4. In some implementations, the second touch electrode 17 can be a grid-shaped electrode as illustrated in FIG. 5. That is, the shape of the second touch electrodes 17 is a grid. Optionally the material of the second touch electrode 17 can include a metal material, or a combination of a metal material and indium tin oxide, for example. When the second touch electrode is grid-shaped, the transmissivity of display light rays may be improved. Furthermore if the grid-shaped second touch electrodes 17 are made of a metal material, or a combination of a metal material and indium tin oxide, the resistance of the second touch electrodes may be lowered to thereby improve the sensitivity of the display panel in response to a touch operation, as compared with the second touch electrodes made of indium tin oxide.

Figure 6:
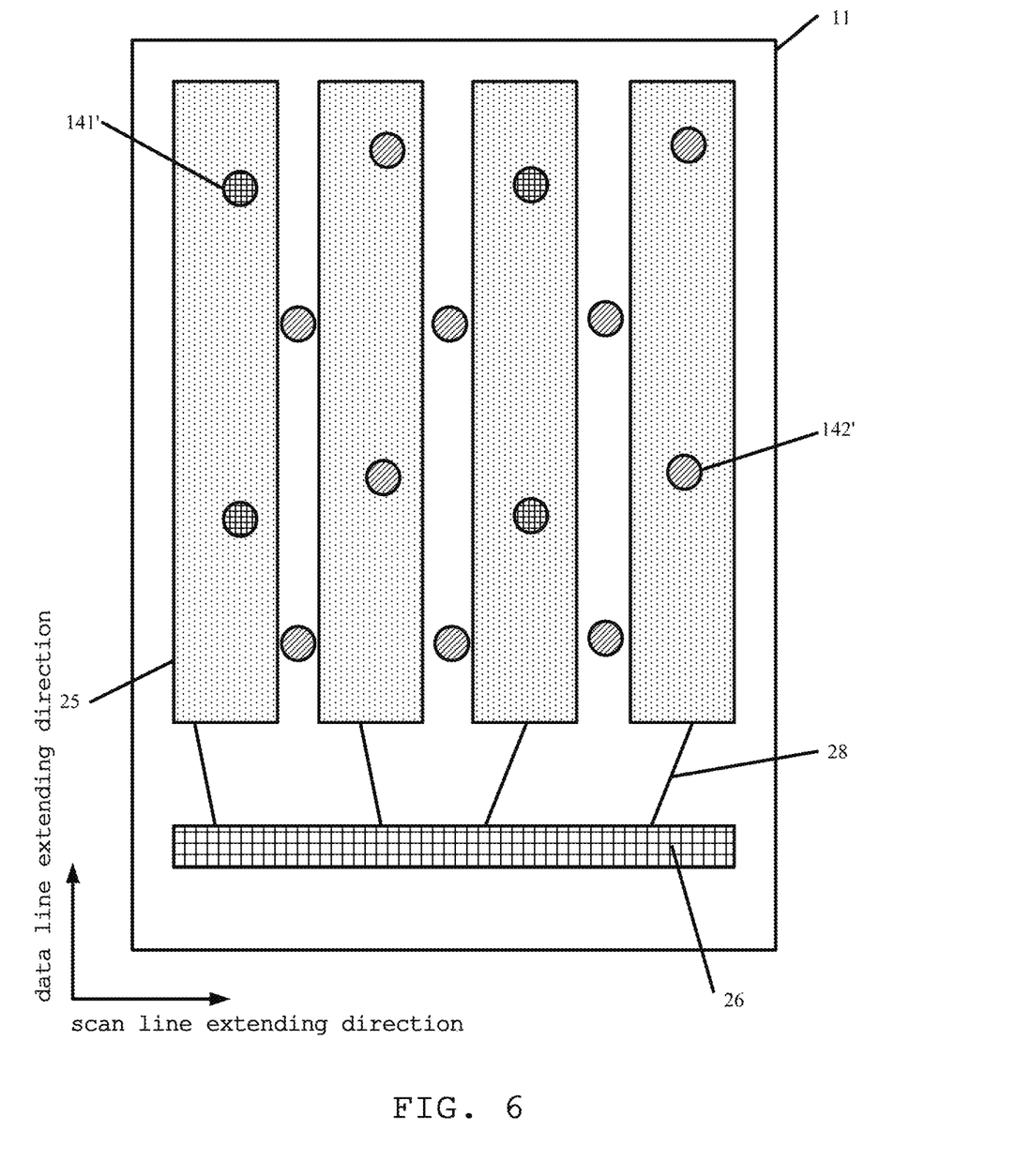
FIG. 6 illustrates the shape of first touch electrodes, and a relative location relationship between the first touch electrodes and the first pillar spacers according to another embodiment of the disclosure.

Reference is made to FIG. 6 which illustrates the shape of the first touch electrodes, and a relative location relationship between the first touch electrodes and the first pillar spacers according to another embodiment of the disclosure. Like the embodiment illustrated in FIG. 3, a plurality of strip-shaped electrodes 25 and an integrated circuit 26 are included on the array substrate 11. Unlike the embodiment illustrated in FIG. 3, the first touch electrodes 25 extend parallel to the direction in which the data lines extend, and the plurality of first touch electrodes 25 are arranged in the direction in which the scan lines extend, as illustrated in FIG. 6.

As illustrated in FIG. 6, the first touch electrodes 25 extend parallel to the direction in which the data lines extend, and the plurality of first touch electrodes 25 are arranged in the direction in which the scan lines extend. The integrated circuit 26 arranged on the first substrate 11 is electrically connected with the respective first touch electrodes 25 through a plurality of first signal lines 28. In the touch period, the integrated circuit 26 transmits a touch drive signal to the respective first touch electrodes 25 sequentially through the first signal lines 28. In the display period, the integrated circuit 26 transmits the same common voltage signal concurrently to the respective first touch electrodes 25 through the first signal lines 28. The first touch electrodes and the integrated circuit are arranged as such so that a part of the first signal lines arranged on sides adjacent to the integrated circuit can be omitted with to thereby narrow a frame of the display panel.

Figure 7:
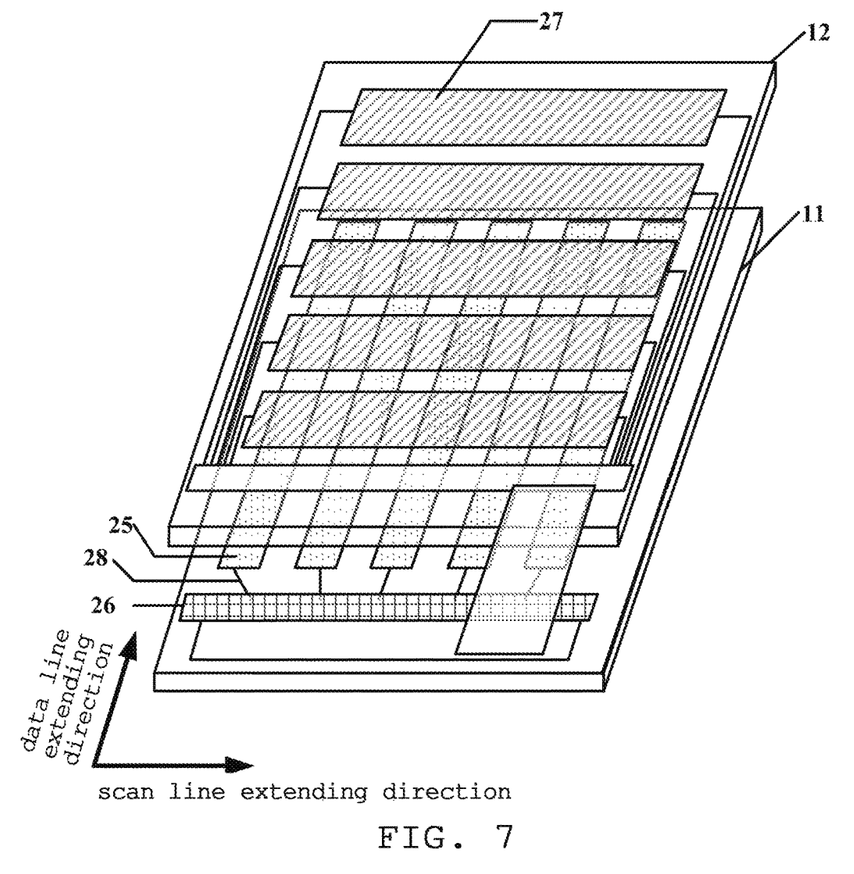
FIG. 7 illustrates a schematic structural diagram of the first substrate and a second substrate in a display panel including the first substrate illustrated in FIG. 5.

Reference is made to FIG. 7 which illustrates a schematic structural diagram of the first substrate and the second substrate in the display panel in which the first substrate is as that illustrated in FIG. 6. As illustrated in FIG. 7, a plurality of strip-shaped second touch electrodes 27 can be arranged in the second substrate 12. The orthographic projections of the second touch electrodes 27 onto the plane where the first substrate 11 is located overlap partially with the orthographic projections of the respective first touch electrodes 25 onto the plane where the first substrate 11 is located. That is, the respective second touch electrodes 27 overlap partially with the respective first touch electrodes 25. The respective second touch electrodes 27 intersect partially with the respective first touch electrodes 25 to form a plurality of capacitors distributed in the display area of the display panel. Optionally the second touch electrodes 27 may extend parallel to the direction in which the scan lines extend, and the plurality of second touch electrodes 27 may be arranged in the direction in which the data lines extend, for example. For example, the material of the second touch electrodes can be indium tin oxide.

Figure 8:
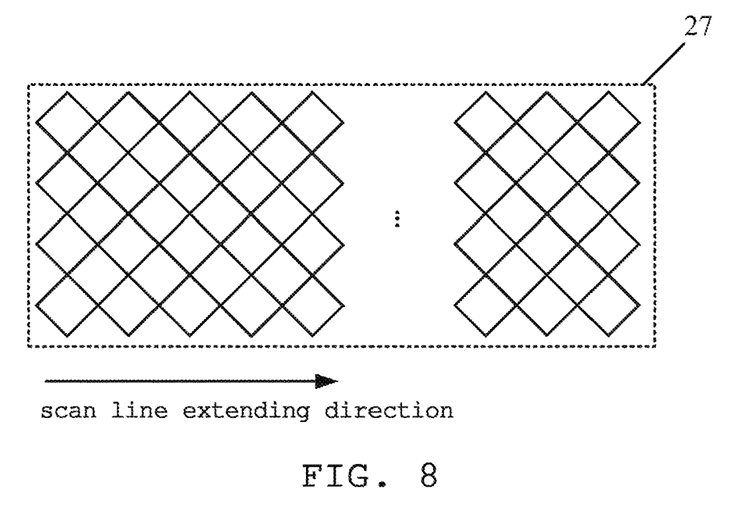
FIG. 8 illustrates a schematic structural diagram of a second touch electrode in the display panel illustrated in FIG. 6.

Reference is made to FIG. 8 which illustrates a schematic structural diagram of a second touch electrode in the display panel illustrated in FIG. 6. In some implementations, the second touch electrodes 27 can be a grid-shaped electrode as illustrated in FIG. 8. The second touch electrode 27 is arranged as such for such a benefit that the transmissivity of display light rays can be improved. For example, the material of the second touch electrode 27 can include a metal material, or a combination of a metal material and indium tin oxide. When the grid-shaped second touch electrode is made of a metal material, or a combination of a metal material and indium tin oxide, the resistance of the second touch electrode will be lowered as compared with the second touch electrode made of indium tin oxide to thereby improve the intensity of a capacitance detection signal, and further the sensitivity of the display panel in response to a touch operation.

The orthographic projections 141' of the first ends of the first pillar spacers onto the plane where the first substrate is located lie in the orthographic projections of the first touch electrodes 25 onto the plane where the first substrate is located. That is, the surface of the first substrate 11 in contact with the respective first pillar spacers is so uniform in height that the liquid crystal layer formed by the respective first pillar spacers can be uniform in thickness as a whole to thereby alleviate an image displayed on the display panel from being rippled due to a varying thickness of the liquid crystal layer resulting from the non-uniform height of the surface of the first substrate in contact with the first ends of the first pillar spacers.

It can be appreciated that like the embodiment illustrated in FIG. 3, the projections 142' of the first ends of the second pillar spacers onto the plane where the first substrate is located can each overlap partially with the orthographic projection of a gap between any two adjacent first touch electrodes 25 onto the plane where the first substrate is located. Alternatively the projections 142' of the first ends of the second pillar spacers onto the plane where the first substrate is located lie in the orthographic projections of the first touch electrodes 25 onto the plane where the first substrate is located.

Figure 9:
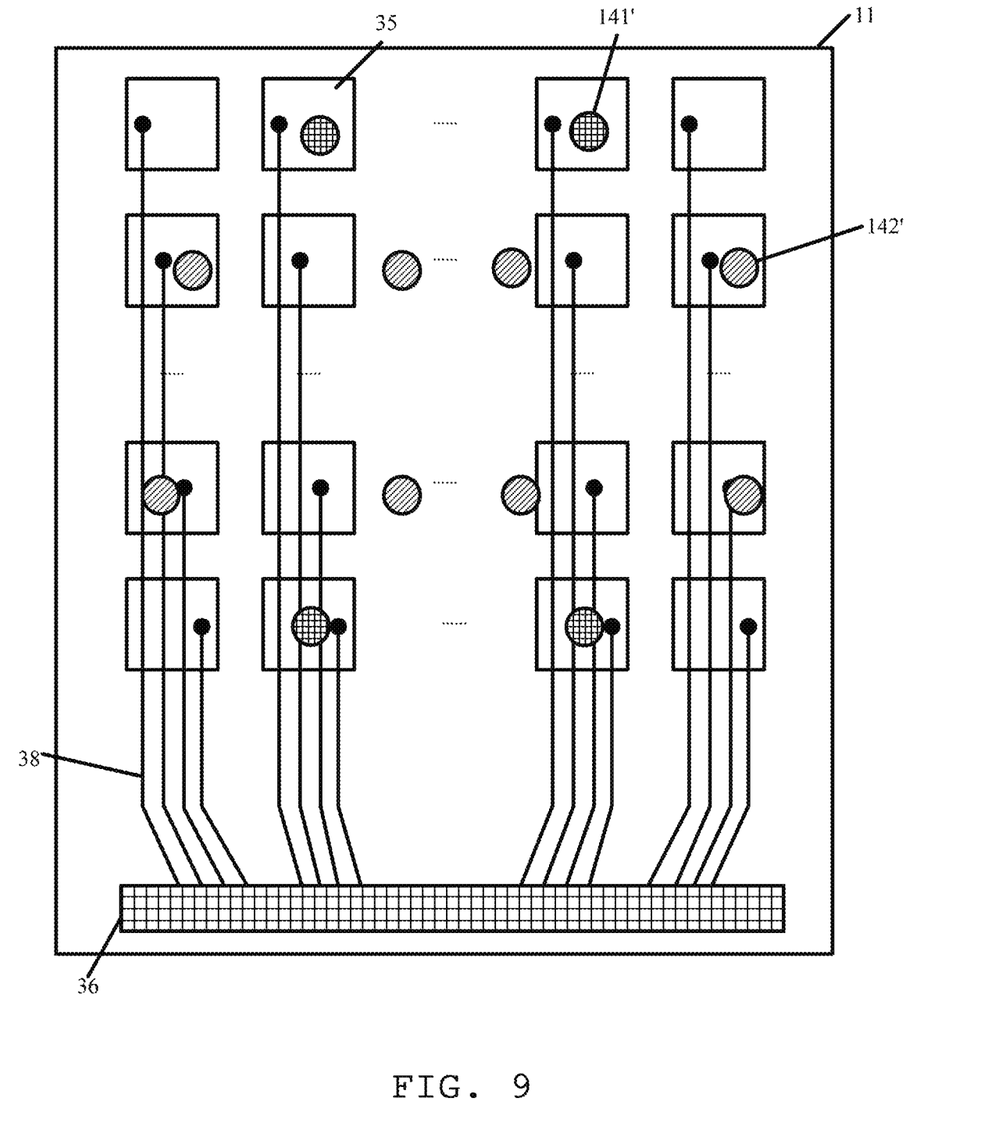
FIG. 9 illustrates the shape of first touch electrodes, and a relative location relationship between the first touch electrodes and the first pillar spacers according to a further embodiment of the disclosure.

Further reference is made to FIG. 9 which the shape of the first touch electrodes, and a relative location relationship between the first touch electrodes and the first pillar spacers according to a further embodiment of the disclosure. As illustrated in FIG. 9, a plurality of block-shaped first touch electrodes 35 are included on the first substrate, and the plurality of first touch electrodes 35 are arranged in an array. The respective first touch electrodes 35 are electrically connected with an integrated circuit 36 arranged on the array substrate 11 through first touch signal lines 38. Capacitors are formed between the respective block-shaped first touch electrodes 35 and the infinity or the ground. That is, the first touch electrodes 35 illustrated in FIG. 9 are self-capacitive touch electrodes. An operating period of a display panel including the first substrate illustrated in FIG. 9 includes a display period and a touch period, in both of which the display panel can operate in a time division mode. In the touch period, the integrated circuit 36 inputs a touch drive signal to the first touch electrodes 35 through the first touch signal signals 38. The first touch electrodes 35 output touch sense signals to the integrated circuit 16 through the first touch signal lines 38. When there is a touch operation on the display panel, a capacitance between a touch electrode proximate to the touch point and the ground will vary, and the touch sense signal output to the first touch electrode 35 proximate to the touch point will be processed to thereby determine the location of the touch point. In the display period, the first touch electrodes 35 are multiplexed as a common electrode, and the integrated circuits 36 transmit the same common voltage signal to the respective first touch electrodes 35.

As illustrated in FIG. 9, the orthographic projections 141' of the first ends of the first pillar spacers onto the plane where the first substrate is located lie in the orthographic projections of the first touch electrodes 35 onto the plane where the first substrate 11 is located. In this way, the surface of the first substrate 11 in contact with the respective first pillar spacers is uniform in height to thereby avoid an image displayed on the self-capacitive touch display panel from being rippled due to a varying thickness of the liquid crystal layer resulting from the non-uniform height of the array substrate in contact with the first ends of the first pillar spacers 141.

The orthographic projections 142' of the first ends of the second pillar spacers onto the plane where the first substrate is located each lie in the orthographic projection of an area between two adjacent rows of first touch electrodes 35 onto the plane where the first substrate is located. Alternatively, the orthographic projections 142' of the first ends of the second pillar spacers onto the plane where the first substrate is located each lie in the orthographic projection of an area between two adjacent columns of first touch electrodes onto the plane where the first substrate is located. Alternatively, all the orthographic projections 142' of the first ends of the second pillar spacers onto the plane where the first substrate is located can lie in the orthographic projections of the first touch electrodes 35 onto the plane where the first substrate is located. Since the first pillar spacers primarily play a role of forming the box thickness of the liquid crystal layer, and protecting the liquid crystal layer, the arrangement of the second pillar spacers is strictly constrained so that the complexity of the process of forming the second pillar spacers can be lowered.

Figure 10:
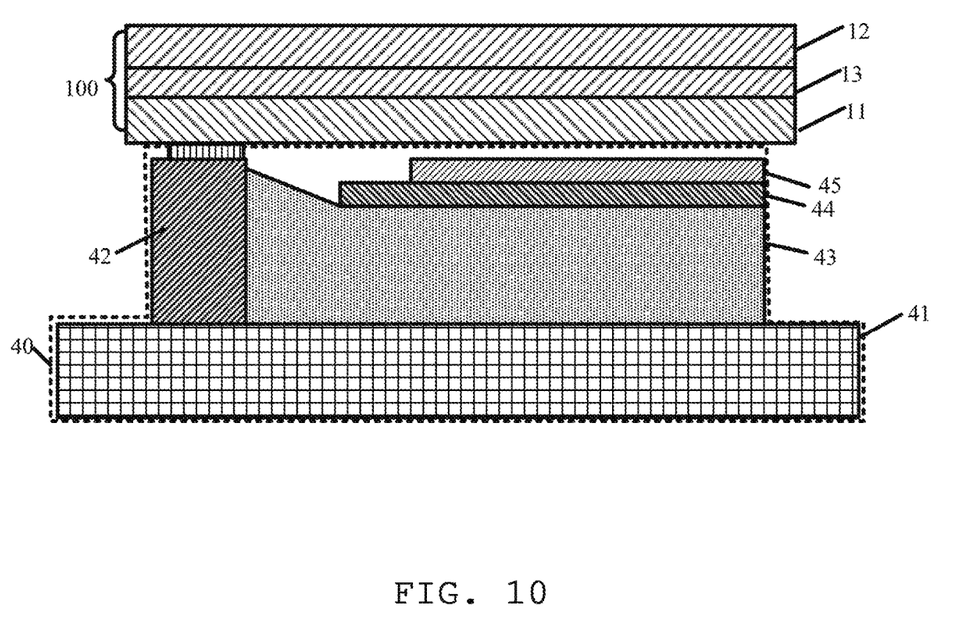
FIG. 10 illustrates a schematic structural diagram of a display device according to an embodiment of the disclosure.

In some embobdiments, a display device is provided, and reference is made to FIG. 10 which illustrates a schematic structural diagram of a display device according to an embodiment of the disclosure. As illustrated in FIG. 10, the display device includes a backlight unit 80, and a display panel 100 arranged on a light exit side of the backlight unit

40. The backlight unit 40 includes a reflecting sheet 41, a group of lamp strips 42 and a light guiding plate 43 arranged on the side of the reflecting sheet 41 with a reflecting film layer, a diffusing sheet 44 arranged on the side of the light guiding plate 43 away from the reflecting sheet 41, and a light enhancing sheet 45 arranged on the side of the diffusing sheet 44 away from the light guiding plate 43. The display panel 100 includes the first substrate 11, the second substrate 12, and the liquid crystal layer 13 between the first substrate 11 and the second substrate 12, as described above. Furthermore those skilled in the art can appreciate that the display device according to the embodiment of the disclosure can further include some other well-known components in addition to the display panel, e.g., a lower polarizing sheet arranged on the side of the display panel proximate to the backlight unit, an upper polarizing sheet arranged on the side of the display panel away from the backlight unit, etc. These well-known components will not be further described so as not to obscure the focus of the disclosure.

The foregoing description is merely illustrative of the preferred embodiments of the disclosure, and the technical principle applied thereto. Those skilled in the art shall appreciate that the scope of the disclosure will not be limited to the technical solutions in particular combinations of the technical features above, but shall also encompass other technical solutions in any combinations of the technical features above or their equivalent features without departing from the spirit of the invention, e.g., technical solutions in which the technical features above, and the functionally similar technical features disclosed in the present application (without any limitation thereto) are replaced with each other.

What is claimed is:

1. A display panel, comprising:
    a first substrate,
    a second substrate arranged opposite to the first substrate, and
    first pillar spacers and second pillar spacers arranged between the first substrate and the second substrate, wherein a height of the first pillar spacers is larger than a height of the second pillar spacer; and, wherein
    the first substrate comprises a plurality of first touch electrodes;
    the first pillar spacers comprise first ends formed on the first substrate and second ends formed on the second substrate, and orthographic projections of the first ends of the first pillar spacers onto a plane lie in orthographic projections of the first touch electrodes onto the plane, wherein the first substrate is located in the plane; and
    the second pillar spacers comprise first ends away from the second substrate, and orthographic projections of the first ends of the second pillar spacers onto the plane each overlap partially with a orthographic projection of a gap between an adjacent pair of first touch electrodes on the plane, wherein no other electrode is located between the adjacent pair of first touch electrodes.

2. The display panel according to claim 1, wherein the first substrate comprises a plurality of scan lines and a plurality of data lines,
    wherein the first touch electrodes extend parallel in a direction in which the scan lines extend, each of the first touch electrodes is of a strip shape; and the plurality of first touch electrodes are arranged in a direction in which the data lines extend; or
    wherein the first touch electrodes extend parallel in a direction in which the data lines extend, each of the first touch electrodes is of a strip shape, and the plurality of first touch electrodes are arranged in a direction in which the scan lines extend.

3. The display panel according to claim 1, wherein the first substrate comprises a plurality of scan lines and a plurality of data lines, and
    wherein the first touch electrodes extend parallel in a direction in which the data lines extend, each of the first touch electrodes is of a strip shape, and the plurality of first touch electrodes are arranged in a direction in which the scan lines extend.

4. The display panel according to claim 3, wherein a plurality of second touch electrodes are formed on the second substrate; and
    orthographic projections of the second touch electrodes onto the plane overlap partially with the orthographic projections of the first touch electrodes onto the plane.

5. The display panel according to claim 4, wherein
    each of the second touch electrodes is of a strip shape;
    the second touch electrodes extend parallel to the direction in which the scan lines extend; and
    the plurality of second touch electrodes are arranged in the direction in which the data lines extend.

6. The display panel according to claim 4, wherein
    each of the second touch electrodes is of a strip shape;
    the second touch electrodes extend parallel to the direction in which the data lines extend; and
    the plurality of second touch electrodes are arranged in the direction in which the scan lines extend.

7. The display panel according to claim 5, wherein a material of the second touch electrodes comprises indium tin oxide.

8. The display panel according to claim 6, wherein a material of the second touch electrodes comprises indium tin oxide.

9. The display panel according to claim 4, wherein
    the second touch electrodes are grid-shaped electrodes; and
    a material of the second touch electrodes comprises a metal material, or a combination of a metal material and indium tin oxide.

10. The display panel according to claim 4, wherein
    the first touch electrodes are touch emitting electrodes, and the second touch electrodes are touch sensing electrodes; and
    the first touch electrodes are multiplexed as a common electrode in a display period.

11. The display panel according to claim 1, wherein the first touch electrodes are block-shaped, and the plurality of first touch electrodes are arranged in an array.

12. The display panel according to claim 11, wherein
    the second pillar spacers comprise first ends away from the second substrate; and
    orthographic projections of first ends of the second pillar spacers onto the plane lie in one of the following:
    the orthographic projections of the first touch electrodes onto the plane;
    a orthographic projection of an area between two adjacent rows of the first touch electrodes onto the plane; and
    orthographic projections of first ends of the second pillar spacers onto the plane each lie in a orthographic projection of an area between two adjacent columns of the first touch electrodes onto the plane.

13. The display panel according to claim 11, wherein
    the first touch electrodes are self-capacitive touch electrodes in a touch period; and
    the first touch electrodes are multiplexed as a common electrode in a display period.

14. The display panel according to claim 1, wherein
the first substrate comprises a plurality of pixels defined by the plurality of scan lines and the plurality of data lines arranged intersecting with and insulated from each other, each of the pixels comprises at least one pixel electrode, at least one thin film transistor and at least one through-hole, and the pixel electrode is electrically connected with the thin film transistor through the through-hole;
the first ends of the first pillar spacers are each arranged between two of the through-holes adjacent in a direction in which the scan lines extend; and
ends of the second pillar spacers away from the second substrate are each arranged between two of the through-holes adjacent in the direction in which the scan lines extend.

15. The display panel according to claim 14, wherein the display panel is a liquid crystal display panel;
the first substrate is an array substrate, and the second substrate is a color filter substrate; and
the display panel further comprises a liquid crystal layer arranged between the first substrate and the second substrate.

16. A display device, comprising the display panel according to claim 1.

17. The display panel according to claim 3, wherein orthographic projections of the first ends of the second pillar spacers onto the plane lie in the orthographic projections of the first touch electrodes onto the plane.

* * * * *